(12) United States Patent
Wang et al.

(10) Patent No.: US 8,942,495 B2
(45) Date of Patent: Jan. 27, 2015

(54) METHODS AND DEVICES FOR ENCODING AND DECODING TRANSFORM DOMAIN FILTERS

(71) Applicant: Research In Motion Limited, Waterloo (CA)

(72) Inventors: Jing Wang, Waterloo (CA); Xiang Yu, Kitchener (CA); Dake He, Waterloo (CA); Steven Wayne Campbell, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 127 days.

(21) Appl. No.: 13/681,551

(22) Filed: Nov. 20, 2012

(65) Prior Publication Data

US 2013/0129241 A1    May 23, 2013

Related U.S. Application Data

(60) Provisional application No. 61/562,294, filed on Nov. 21, 2011.

(51) Int. Cl.
*G06K 9/62*    (2006.01)
*G06T 9/00*    (2006.01)
(Continued)

(52) U.S. Cl.
CPC .......... *G06T 9/004* (2013.01); *H04N 19/00066* (2013.01); *H04N 19/00351* (2013.01); *H04N 19/00812* (2013.01); *H04N 19/00896* (2013.01)
USPC ........................................................ 382/233

(58) Field of Classification Search
USPC ............................ 382/232, 233, 236, 239, 240
See application file for complete search history.

(56) References Cited

U.S. PATENT DOCUMENTS

| 6,163,575 A | 12/2000 | Nieweglowski et al. |
| 6,212,235 B1 | 4/2001 | Nieweglowski et al. |

(Continued)

FOREIGN PATENT DOCUMENTS

| CA | 2701758 | 4/2009 |
| CA | 2719232 | 10/2009 |

(Continued)

OTHER PUBLICATIONS

Xiang Yu et al: "Adaptive quantization with balanced distortion distribution and its application to H.264 Intra coding" Image Processing (ICIP). 2009 16th IEEE International Conference on,IEEE, Piscataway, NJ, USA LNKD DOI:10.1109/CIP.2009.5413738, Nov. 7, 2009, pp. 1049-1052. XP031628437.

(Continued)

*Primary Examiner* — Duy M Dang
(74) *Attorney, Agent, or Firm* — Rowand LLP

(57) ABSTRACT

Methods and devices for encoding and decoding data using transform domain filtering are described. The encoder determines a set of transform domain filter coefficients to be applied to a transform domain prediction. The filtering may, in some cases, also apply to transform domain reconstructions. Rate-distortion optimization may be used to determine the optimal filter coefficients on a frame-basis, coding-unit-basis, or other basis. Multiple filters may be developed and communicated from the encoder to the decoder for different combinations of transform block size, coding mode, prediction mode, and texture type. In other cases, the filtering is applied in the pixel-domain to a pixel-domain prediction or a pixel-domain reconstruction of a block of samples.

19 Claims, 11 Drawing Sheets

(51) Int. Cl.
*H04N 19/117* (2014.01)
*H04N 19/19* (2014.01)
*H04N 19/625* (2014.01)
*H04N 19/82* (2014.01)

(56) References Cited

U.S. PATENT DOCUMENTS

| | | | |
|---|---|---|---|
| 6,507,617 | B1 | 1/2003 | Karczewicz et al. |
| 6,526,096 | B2 | 2/2003 | Lainema et al. |
| 6,690,307 | B2 | 2/2004 | Karczewicz |
| 6,696,993 | B2 | 2/2004 | Karczewicz |
| 6,711,209 | B1 | 3/2004 | Lainema et al. |
| 6,724,944 | B1 | 4/2004 | Kalevo et al. |
| 6,735,249 | B1 | 5/2004 | Karczewicz et al. |
| 6,738,423 | B1 | 5/2004 | Lainema et al. |
| 6,741,648 | B2 | 5/2004 | Karczewicz et al. |
| 6,765,963 | B2 | 7/2004 | Karczewicz et al. |
| 6,795,584 | B2 | 9/2004 | Karczewicz et al. |
| 6,856,701 | B2 | 2/2005 | Karczewicz et al. |
| 6,879,268 | B2 | 4/2005 | Karczewicz |
| 6,907,142 | B2 | 6/2005 | Kalevo et al. |
| 6,920,175 | B2 | 7/2005 | Karczewicz et al. |
| 6,950,469 | B2 | 9/2005 | Karczewicz et al. |
| 7,149,251 | B2 | 12/2006 | Karczewicz et al. |
| 7,161,983 | B2 | 1/2007 | Laineman et al. |
| 7,200,174 | B2 | 4/2007 | Lainema et al. |
| 7,242,815 | B2 | 7/2007 | Kalevo et al. |
| 7,280,599 | B2 | 10/2007 | Karczewicz et al. |
| 7,289,674 | B2 | 10/2007 | Karczewicz |
| 7,295,713 | B2 | 11/2007 | Kalevo et al. |
| 7,336,837 | B2 | 2/2008 | Ridge et al. |
| 7,388,996 | B2 | 6/2008 | Lainema et al. |
| 7,477,689 | B2 | 1/2009 | Karczewicz et al. |
| 7,567,719 | B2 | 7/2009 | Kalevo et al. |
| 7,664,176 | B2 | 2/2010 | Bao et al. |
| 7,706,447 | B2 | 4/2010 | Karczewicz et al. |
| 7,756,206 | B2 | 7/2010 | Ridge et al. |
| 7,792,193 | B2 | 9/2010 | Tanizawa et al. |
| 8,036,273 | B2 | 10/2011 | Karczewicz et al. |
| 2006/0013497 | A1 | 1/2006 | Yang et al. |
| 2007/0147497 | A1 | 6/2007 | Bao et al. |
| 2007/0217506 | A1 | 9/2007 | Yang et al. |
| 2009/0060040 | A1 | 3/2009 | Jeon et al. |

FOREIGN PATENT DOCUMENTS

| | | |
|---|---|---|
| CA | 2729904 | 1/2010 |
| EP | 0550012 A2 | 7/1993 |
| EP | 2192786 | 6/2010 |
| EP | 2617199 | 7/2013 |
| JP | 2007049312 | 2/2007 |
| WO | 2010024622 A2 | 3/2010 |

OTHER PUBLICATIONS

En-Hui Yang et al: "Soft Decision Quantization for H.264 With Main Profile Compatibility" IEEE Transactions on Circuits and Systems for Video Technology, IEEE Service Center, Piscataway, NJ, US LNKD 001:10 1109fTCSVT.2008.2009260, vol. 19, No. 1, Jan. 1, 2009, pp. 122-127, XP011280553.
En-Hui Yang et al: "Rate Distortion Optimization for H.264 Interframe Coding: A General Framework and Algorithms" IEEE Transactions on Image Processing, IEEE Service Center, Piscataway, NJ, US LNKD—DOI:10.1109fTIP.2007.896685, vol. 16. No. 7, Jul. 1, 2007, pp. 1774-1764, XP011185448.
Matthew Crouse et al: "Joint Thresholding and Quantizer Selection for Transform Image Coding: Entropy-Constrained Analysis and Applications to Baseline JPEG" IEEE Transactions on Image Processing, IEEE Service Center. Piscataway, NJ, US, vol. 6, No. 2, Feb. 1, 1997, XP011026108.
Jiangtao Wen et al: "Trellis-Based R-D Optimal Quantization in H.263+" IEEE Transactions on Image Processing,IEEE Service Center, Piscataway, NJ, US. vol. 9, No. 8,Aug. 1, 2000, XP011025644.

Extended European Search Report, relating to EP No. 10168613.7 dated Oct. 28, 2010.
T. Wiegand and G. J. Sullivan and A. Luthra, ITU-T Rec. H.264/ISOIIEC 14496-10 AVC, Joint Video Team of ISO/IEC MPEG and ITU-T VCEG.
E.-h. Yang and X. Yu, On joint optimization of motion compensation, quantization and baseline entropy coding in H.264 w1th complete decoder compatibility, Proceedings of IEEE International Conference on Acoustics, Speech, and Signal Processing, pp. II325-II328, Mar. 2005.
E.-h. Yang and X. Yu. Rate Distortion Optimization of H.264 with Main Profile Compatibility, IEEE International Symposium on Information Theory, pp. 282-286, Jul. 2006.
S. Lloyd, "Least Squares Quantization in PCM". IEEE Trans. on Information Theory, vol. IT-28, No. 2, pp. 129-137, Mar. 1982.
H.R Malvar, A. Hallapuro, M. Karczewicz, L Kerofsky, "Low-complexity transform and quantization in H.264/AVC," IEEE Transactions on Circuits and Systems for Video Technology, vol. 13, Issue 7, pp. 598-603, Jul. 2003.
A. Tanizawa, T. Chujoh, "Simulation results of Adaptive Quantization Matrix Selection on KTA software," ITU—SG16/Q6, Document VCEG-AC07, Klagenfurt, Austria, Jul. 17-18, 2006.
Xiang Li, et al., "CE4 Subtest3: Adaptive De-Quantization Offset", Joint Collaboration Team on Video Coding (JCT-VC) of ITU-T SG16 WP3 and ISO/IEC JTC1/SC29/WG11, JCTVC-F119.
Xianglin Wang, et al., "Fine Granularity QP Change at Slice Level", Joint Collaboration Team on Video Coding (JCT-VC) of ITU-T SG16 WP3 and ISO/IEC JTC1/SC29/WG11, JCTVC-F610.
Thomas Wedi, et al., "Rate-Distortion Constrained Estimation of Quantization Offsets", Joint Video Team (JVT) of ISO/IEC MPEG & ITU-T VCEG (ISO/IEC JTC1/SC29/WG11 and ITU-T-SG16 Q.6), JVT-O066.
International Searching Authority, Written Opinion and International Search Report relating to application No. PCT/CA2011/050559 dated Dec. 12, 2011.
International Search Report dated Nov. 16, 2011, PCT/CA2011/050350.
ITU-T Recommendation H.264/ISO/IEC 14496-10 AVC, Advanced video coding for general audiovisual services, Nov. 2007.
I. Amonou et al: "Description of video coding technology proposal by France Telecom, NTT, NTT DOCOMO, Panasonic and Technicolor", JCTVC-A114, Joint Collaborative Team on Video Coding (JCT-VC) of ITU-T SG16 WP3 and ISO/IEC JTC1/SC29/WG11, 1st Meeting: Dresden, DE, Apr. 15-23, 2010.
M. Karczewicz et al: "Video coding technology proposal by Qualcomm Inc.", JCTVC-A121, Joint Collaborative Team on Video Coding (JCT-VC) of ITU-T SG16 WP3 and ISO/IEC JTC1/SC29/WG11, 1st Meeting: Dresden, DE, Apr. 15-23, 2010.
EPO, Extended European Search Report relating to application No. 11183606.0 dated Nov. 24, 2011.
Wedi: "Quantization with Adaptive Dead-Zone Size", 11. JVT Meeting; 68. MPEG Meeting; Mar. 15, 2004-Mar. 19, 2004; Munich, DE; (Joint Video Team of ISO/IEC JTC1/SC29/WG11 and ITU-T SG.16) No. JVT-K026, Mar. 19, 2004 XP030005843, ISSN: 0000-0421 *section 3*.
Xiang Yu et al: "Quantization with Hard-Decision Partition and Adaptive Reconstruction Levels for Low Delay Setting", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11and ITU-T SG.16); URL: http://wftp3.itu.int/av-arch/jctvc-site/, No. JCTVC-D384, Jan. 16, 2011, XPO30008423, ISSN: 0000-0013 *section 2*.
Jing Wang et al: "Hard-decision quantization with adaptive reconstruction levels for High Efficiency Video Coding", Information Theory (CWIT), 2011 12th Canadian Workshop on, IEEE, May 17, 2011, pp. 62-65, XP031944038, DOI: 10.1109/CWIT.2011.5872124 ISBN: 978-1-4577-0743-8 *section III*.
Korean Patent Office, Korean Office Action relating to Application No. 10-2012-0131728, dated Feb. 17, 2014.
EPO, Extended European Search Report relating to Application No. 12193257.8, dated Jul. 16, 2014.

METHODS AND DEVICES FOR ENCODING AND DECODING TRANSFORM DOMAIN FILTERS

CROSS-REFERENCE TO RELATED APPLICATIONS

The present application claims priority to U.S. patent application Ser. No. 61/562,294 filed Nov. 21, 2011, the contents of which are hereby incorporated by reference.

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices for encoding and decoding transform domain filters.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU: High Efficiency Video Coding (HEVC).

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC will also have these features.

When spectrally transforming residual data, many of these standards prescribe the use of a discrete cosine transform (DCT) or some variant thereon. The resulting DCT coefficients are then quantized using a quantizer that employs a uniform quantization step size.

Quantization is lossy. In other words, it introduces distortion that shows up as noise in the reconstructed images or videos. Accordingly, many existing compression schemes utilize some form of post-processing, i.e. filtering, to try to remove quantization noise from reconstructed pixels. Examples include deblocking filters, de-noising filters, or other pixel-domain filters.

Work in lossy compression, e.g., audio/voice coding, video coding, image coding, etc., tends to focus on improving rate-distortion performance. That is, the objective of most encoding and decoding schemes is to find an optimal balance between distortion and coding rate. A rate-distortion optimization expression of the type $J=D+\lambda R$ is typically used, wherein the Lagrangian multiplier $\lambda$ represents the desired trade-off between coding rate and distortion.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
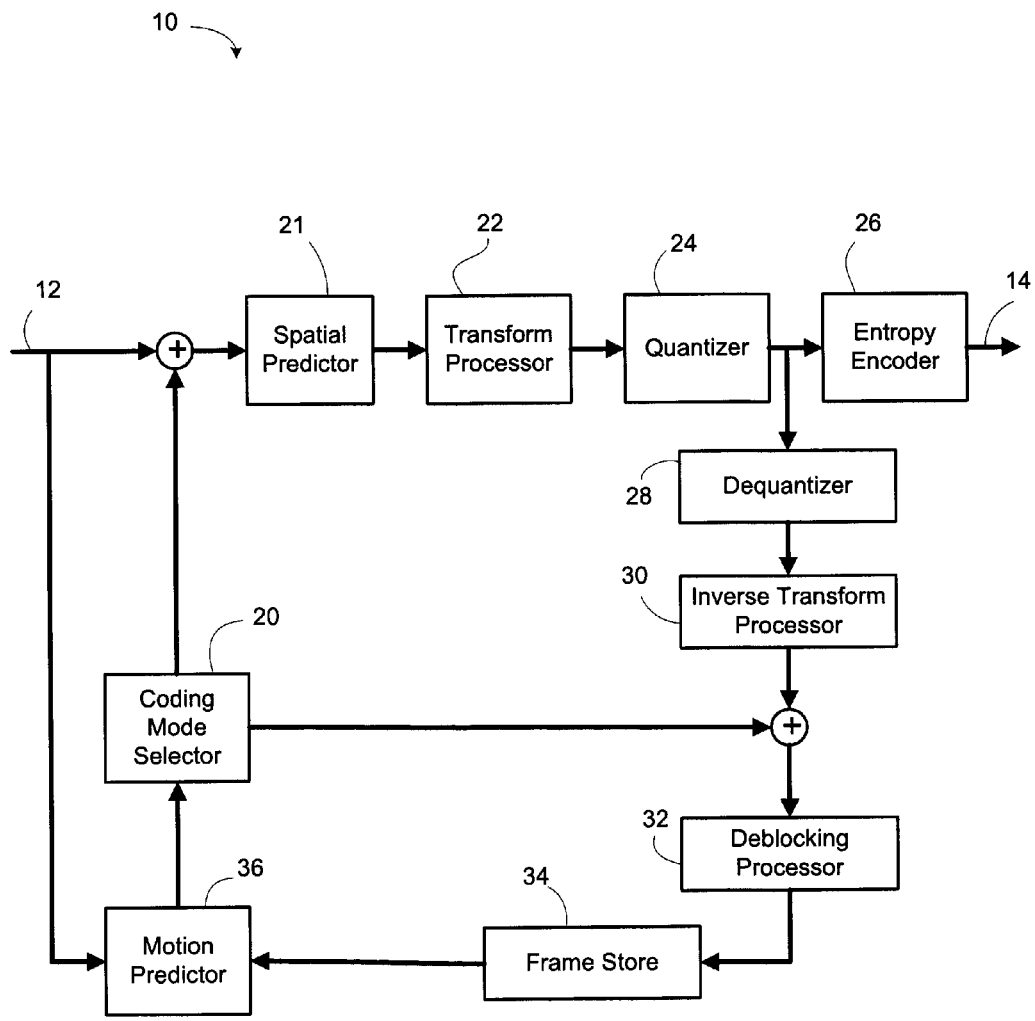
FIG. 1 shows, in block diagram form, an encoder for encoding video.

The present application describes methods and encoders/decoders for achieving rate-distortion improvements in lossy data compression. In some embodiments, the data compression process or devices described herein may be applied to the encoding and decoding of audio data, image data, and/or video data. In particular, the present application describes a method and process of data compression that uses transform domain filtering.

In one aspect, the present application describes a method of decoding filters from a bitstream of encoded data for use in a decoder for reconstructing blocks of samples for an image. The method includes reading filter-type flags from the bitstream, wherein the filter-type flags identify one or more filter types; and for each of the filter types identified, decoding a set of filter coefficients from the bitstream.

In another aspect, the present application describes a method of reconstructing a block of samples from a bitstream of encoded data in a decoder, wherein the decoder has a spectrally transformed prediction block of samples associated with the block of samples. The method includes reading filter-type flags from the bitstream, wherein the filter-type flags identify one or more filter types; for each of the filter types identified, decoding a set of filter coefficients from the bitstream; and calculating a filtered transform domain reconstruction by applying, to at least a portion of the transformed prediction block, one of the sets of filter coefficients based on its filter type matching characteristics associated with the block of samples.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding. Those ordinarily skilled in the art will understand that the present application is not limited to H.264 but may be applicable to other video coding/decoding standards, including possible future standards, such as HEVC. It will also be appreciated that the present application is not necessarily limited to video coding/decoding and may be applicable to audio coding/decoding, image coding/decoding, or the lossy coding/decoding of any other data. The present application is broadly applicable to any lossy data compression process that employs a prediction operation, a spectral transform of a residual following the prediction operation, and quantization of the transformed residual, irrespective of the type of data being coded/decoded.

In the description that follows, when referring to video or images the terms frame, slice, tile and rectangular slice group may be used somewhat interchangeably. Those of skill in the art will appreciate that, in the case of the H.264 standard, a frame may contain one or more slices. It will also be appreciated that certain encoding/decoding operations are performed on a frame-by-frame basis, some are performed on a slice-by-slice basis, some tile-by-tile, and some by rectangular slice group, depending on the particular requirements of the applicable image or video coding standard. In any particular embodiment, the applicable image or video coding standard may determine whether the operations described below are performed in connection with frames and/or slices and/or tiles and/or rectangular slice groups, as the case may be. Accordingly, those ordinarily skilled in the art will understand, in light of the present disclosure, whether particular operations or processes described herein and particular references to frames, slices, tiles, rectangular slice groups are applicable to frames, slices, tiles, rectangular slice groups, or some or all of those for a given embodiment. This also applies to coding units, groups of coding units, etc., as will become apparent in light of the description below.

To the extent that the processes or methods described below are applied to images and/or video they may be applied to a portion of a video or image, such as a frame, a slice, a Group-of-Pictures (GOP), or on any other basis, such as to a coding unit, or group of coding units. To the extent that the process or methods described herein are applied to audio, such as music or voice data, they may be applied to a grouping or sequence of data points, e.g. an audio sample. It should be noted that the terms picture and frame could be used interchangeably.

The description herein refers to filters and filter coefficients for use in the transform domain. It will be understood from the following description that the transform domain filter is a set of scalars or multipliers, each selected to be applied to the transform domain coefficient in a particular transform domain coefficient position. The transform domain filter may be applied to a reconstruction in the transform domain or to a prediction in the transform domain, as will be explained below. The term "filter coefficient" may be used interchangeably herein with "scalar", "adaptive prediction scalar", or "transform domain filter" (TDF).

Although many of the examples below relate to the determination of filter coefficients for transform-domain filtering, it will be appreciated that the filter coefficient transmission processes described herein may be applied to filter coefficients for filtering in the pixel-domain instead. In other words, the processes for encoding and decoding filter information described herein may be applied to transform-domain filter information or pixel-domain filter information.

Figure 2:
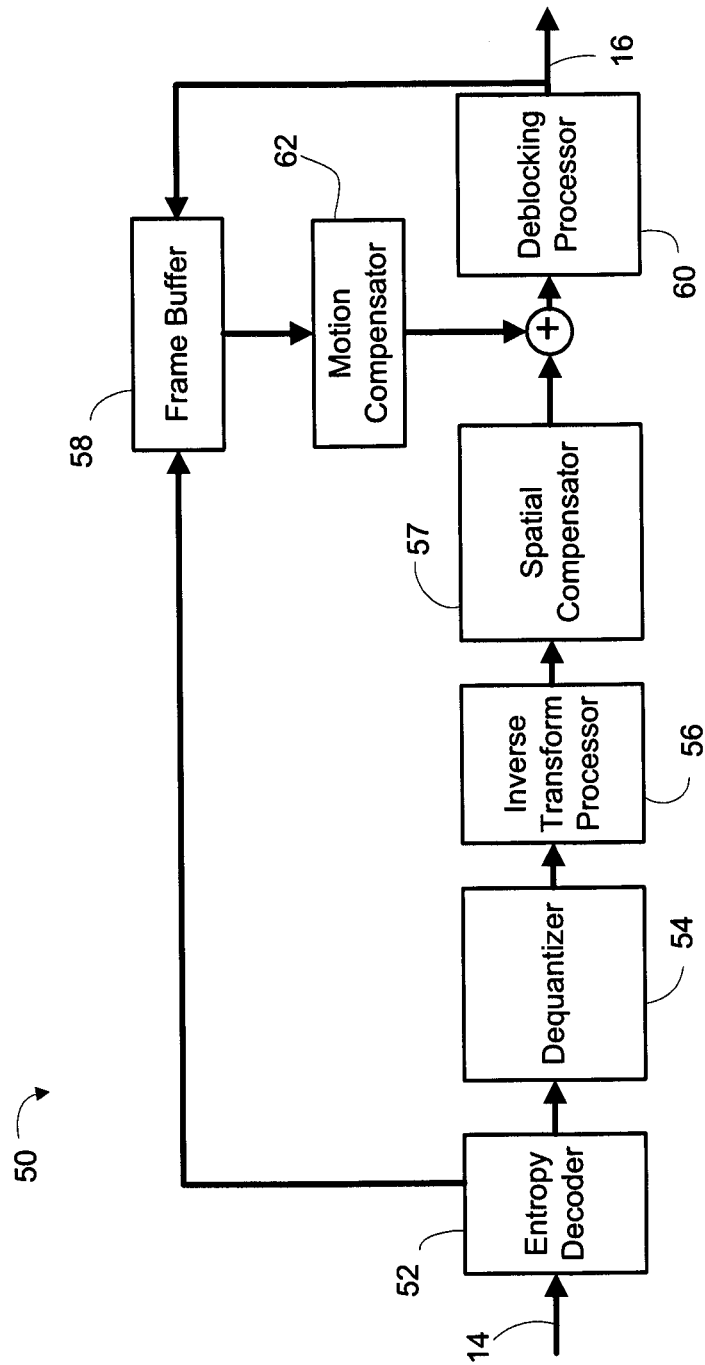
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like HEVC.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a macroblock or sub-block basis, depending on the size of the macroblocks. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing H.264 encoders.

The decoder 50 includes an entropy decoder 52, dequantizer 54, inverse transform processor 56, spatial compensator 57, and deblocking processor 60. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock, the recreated "video data" is the residual data for use in spatial compensation relative to a previously decoded block within the frame. The spatial compensator 57 generates the video data from the residual data and pixel data from a previously decoded block. In other cases, such as inter-coded macroblocks, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock. It does so based on the reference frame information and motion vector specified for the inter-coded macroblock. It then supplies the reference block pixel data for combination with the residual data to arrive at the reconstructed video data for that macroblock.

A deblocking process may then be applied to a reconstructed frame/slice, as indicated by the deblocking processor 60. After deblocking, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that HEVC-compliant encoders and decoders will have many of these same or similar features.

In the description of example embodiments that follows, the following symbol definitions are used:
x=the original frame/block of pixels
p=the predictive block of pixels
$c_x$=the transform of x
$c_p$=the transform of p
z=the pixel domain residual=x−p
$c_z$=the transform of z, i.e. the transform domain coefficients
u=the quantized transform domain coefficients=$Q(c_z)$, where $Q(\cdot)$ denotes the quantization function, and $Q^{-1}(\cdot)$ denotes the inverse quantization function. For example, for a uniform scalar quantization function, the output of $Q(c_z)$ at position (i,j) is given by $$Q(c_{z,i,j})=\text{sign}(c_z)*\text{floor}(\text{abs}(c_{z,i,j})/q_{i,j},$$

where sign(•) denotes the sign function, floor(•) denotes the floor function, abs(•) denotes the absolute function, and denotes the quantization step size at position (i,j).
$\hat{x}$=the reconstructed block of pixels=$p+T^{-1}(Q^{-1}(u))$.

The distortion in a reconstructed block of pixels is the difference between the original block of pixels, x, and its reconstruction $\hat{x}$ at the decoder. Filtering is sometimes applied to the reconstruction $\hat{x}$ in order to reduce distortion. From a signal processing point of view, this may be categorized as low pass filtering. Such filtering generally involves a convolution operation in the pixel domain. It will be appreciated that convolution operations are computationally demanding. Because of the feedback loop at the encoder this computational complexity is present in both the encoding and decoding operations.

In accordance with one aspect of the present application, the quantization distortion is filtered in the transform domain instead of in the pixel domain. Based on having a spectral transform, such as DCT, with unitary property, the filtering normally done to minimize the difference in the pixel domain between the original block of pixels and the reconstructed block of pixels may be carried out in the transform domain before the reconstruction is inverse transformed to create the reconstructed block of pixels.

In the transform domain, the quantization distortion may be expressed as:

$$|c_x - c_p - Q^{-1}(u)|^2 \triangleq \Sigma_{i,j} |c_{x,i,j} - c_{p,i,j} - Q^{-1}(u_{i,j})|^2 \qquad (1)$$

In the case where scalar quantization is used, $Q^{-1}(u) = u*q$, where * represents element-wise multiplication between vectors/matrices.

Because of the unitary property of the transform operation, e.g. DCT, the quality loss in the pixel domain is equivalent to the distortion in the transform domain. In other words:

$$|c_x - c_p - Q^{-1}(u)|^2 = |x - p - T^{-1}(Q^{-1}(u))|^2 \qquad (2)$$

where $T^{-1}$ represents the inverse transform operation.

Convolution in the pixel domain is the equivalent of scaling/multiplication in the transform domain, meaning that a filter realized in the transform domain will be more computationally efficient to implement. Moreover, $u*q$ is already available in the transform domain, thus further reducing the computational complexity.

The aim of a transform domain filter is to reduce quantization distortion. In order for a decoder to apply such a filter, the encoder will transmit the filter coefficients in the bitstream of encoded data. Accordingly, design of the filter at the encoder may be considered from a rate-distortion point of view. A rate-distortion expression for finding a desired filter for N blocks $x_1, x_2, \ldots, x_N$ is as follows:

$$\min_f \Sigma_{k=1}^N |c_{x_k} - f*(c_{p_k} + Q^{-1}(u_k))|^2 + \lambda \cdot r(f) \qquad (3\text{-a})$$

Equation (3-a) reflects a Lagrangian cost function for finding an optimal filter from a rate-distortion point of view. The first term represents the distortion. It will be noted that the distortion in this term is the difference between the transformed original block of samples and the filtered transform domain reconstruction. The cost of sending the filter coefficients is represented by the rate function r(f). $\lambda$ is the Lagrange multiplier. An alternative rate-distortion expression (the justification for which is set out below) is:

$$\min_f \Sigma_{k=1}^N |c_{x_k} - f*(c_{p_k}) - Q^{-1}(u_k)|^2 + \lambda \cdot r(f) \qquad (3\text{-a})$$

The symbol f in Equation (3-a) represents the filter; more specifically, a set or block of filter coefficients in a filter matrix used to scale the transform domain reconstruction. The filter coefficients may also be applied to the prediction, which may also lead to a rate distortion coding performance boost, as shown in (3-b). The filter coefficients may be referred to herein as transform-domain filter (TDF). Equations (3-a) and (3-b) provides some basis for selecting the filter coefficients. It will be recalled that the quantization vector q is a scaling factor. In some embodiments, the quantization vector q may be a vector/matrix specifying quantization values for each coefficient position in the block/matrix. An example is described in U.S. patent application Ser. No. 12/830,548, filed Jul. 6, 2010, and entitled "Methods and Devices for Data Compression Using Adaptive Reconstruction Levels", owned in common herewith. In such a situation, in which the quantization scaling factor for each coefficient position will be signaled to the decoder, Equation (3) may be reformulated as:

$$\min_f \Sigma_{k=1}^N |c_{x_k} - f*(c_{p_k} u_k * q)|^2 + \lambda \cdot r(f) \qquad (4)$$

Furthermore, it will be recalled that the quantization operation to calculate the quantized transform domain coefficients, $u_k$, occurs after the prediction operation that produces the prediction $p_k$ and, thus, the transformed prediction block $c_{p_k}$. It has also been observed by the present inventors that some elements of $c_{p_k}$ are negatively correlated with the elements of $c_{z_k}$. Accordingly, Equation (4) may be simplified as:

$$\min_f \Sigma_{k=1}^N |c_{x_k} - f*c_{p_k}|^2 + \lambda \cdot r(f) \qquad (5)$$

Equation (5) realizes a filter that reduces the residual energy. The residual in this case is the difference between the original block of samples x and the filtered predictive block of samples.

Equations (3) and (5) lead to two possible processes for generating a transform domain filter f. The process according to Equation (3) results in a filter for filtering the reconstruction in the transform domain. The process according to Equation (5) results in a filter for filtering the prediction in the transform domain. They will be described in turn below.

If the filter coefficients are calculated and signaled sufficiently infrequently, the rate aspect of Equation (3) may be negligible. Using this simplification, the expression for finding a desired filter may be restated as follows:

$$\min_f \Sigma_{k=1}^N |c_{x_k} - f*(c_{p_k} + Q^{-1}(u_k))|^2 \qquad (6)$$

The foregoing discussion is based on finding a filter for use in filtering a prediction block in the transform domain. The filter may be designed based upon the statistics of a previous slice or the statistics of the current slice. In some cases, the filter may be designed based upon the statistics of more than one slice, picture, frame, GoP or other collection of data samples. It has been noted that the optimal filter varies depending upon a number of factors because of variation in the data statistics amongst transform units of various types. Relevant factors include the transform unit size, such as 4×4, 8×8, 16×16, 32×32, 64×64, etc.; the transform unit type, e.g. DST or DCT; the texture type, e.g. luma or chroma; and, the coding mode, e.g. inter-coding or intra-coding. In addition, data statistics can vary or be dependent upon motion vectors, prediction modes, etc. Accordingly, in some embodiments different filters may be developed for different permutations of one or more of these factors. For example, separate filters may be developed for 4×4 DST blocks, 4×4 DCT blocks, 8×8 DCT blocks, 16×16 DCT blocks, and 32×32 DCT blocks. For each of those groups or categories of filter, multiple filters may be developed based on permutations of intra or inter coding mode and luma and chroma texture types. Yet further granularity in filter design may be found if within those groups multiple filters are developed based on groups of motion vectors and/or groups of intra-prediction modes. It will be appreciated that in such embodiments, a number of filters may be developed and communicated to the decoder, meaning that the rate aspect of the rate-distortion calculation in filter design is non-negligible.

With a set of inter-coded blocks, the transform coefficients may be grouped based upon motion prediction mode, motion vector magnitude, motion vector direction, or any combination thereof.

Figure 11:
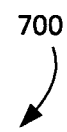
FIG. 11 shows an example grouping of coefficient positions for filtering in a 4×4 block.
Figure 12:
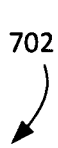
FIG. 12 shows another example grouping of coefficient positions for filtering in a 4×4 block.

Within blocks, rather than developing filter coefficients for each individual coefficient position, some coefficient positions may be grouped based on statistical similarities. Those coefficient positions in the same group would share the same filter coefficient. Reference may be made to FIG. 11, which illustrates one example embodiment of a grouping of coefficients for filtering a 4×4 block 700. In this example, the filter includes seven filter coefficients (indicated by numbers 0 through 6 within the block 700). The coefficient groups are indicated by the heavier lines, and the filter coefficient applicable to each position is indicated. FIG. 12 shows another example embodiment of a grouping of coefficients for filtering a 4×4 block 702. In this example, the filter includes four filter coefficients. The grouping of coefficient positions to use a common filter coefficient may be applied to larger blocks. The specific pattern used to group coefficients may depend on statistical analysis of the coefficients.

In some cases, the pattern is similar to the patterns shown in FIG. 11 or 12 but scaled up to the larger block size. For example, the pattern and the right and bottom edges may be extended to the larger size of the block. As an example, the 4×4 pattern shown in FIG. 11 may be extended to 8×8 by including the filter coefficients in column 0, rows 4 to 7, in group number 5. The filter coefficients in row 0, columns 4-7, are in group 4. All remaining added filter coefficients are in group 6.

It will be appreciated that other patterns may also be used and that the selection of a suitable pattern for grouping coefficient positions in the filter design may be based upon empirical data statistics.

Figure 13:
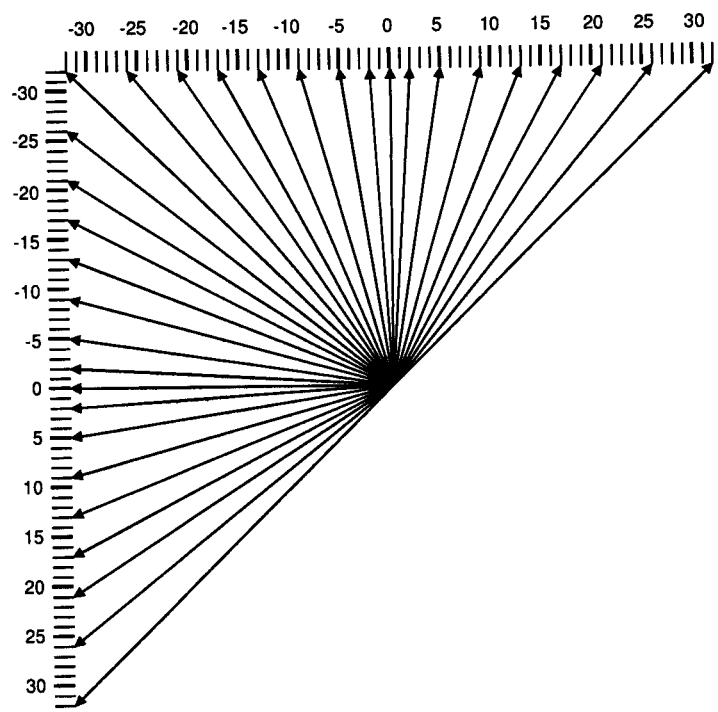
FIG. 13 illustrates the various angles-of-prediction defined for intra-coding.

With intra-coding, filters may be developed that apply to specified groupings of direction prediction modes. For example, in the current HEVC development it is proposed that there will be 33 directional prediction modes plus a DC prediction for intra-coded blocks. FIG. 13 illustrates the intra-prediction angle definitions for HEVC.

Data may be grouped on the basis of angle-of-prediction direction. For example, the following intra-coding mode filter types may be defined:

Filter type=0: angle of prediction direction: 45 deg-67.5 deg

Filter type=1: angle of prediction direction: 67.5 deg-112.5 deg

Filter type=2: angle of prediction direction: 112.5 deg-157.5 deg

Filter type=3: angle of prediction direction: 157.5 deg-202.5 deg

Filter type=4: angle of prediction direction: 202.5 deg-225 deg

Filter type=5: DC prediction

Other groupings on the basis of angle-of-prediction may also be used in other embodiments.

Figure 3:
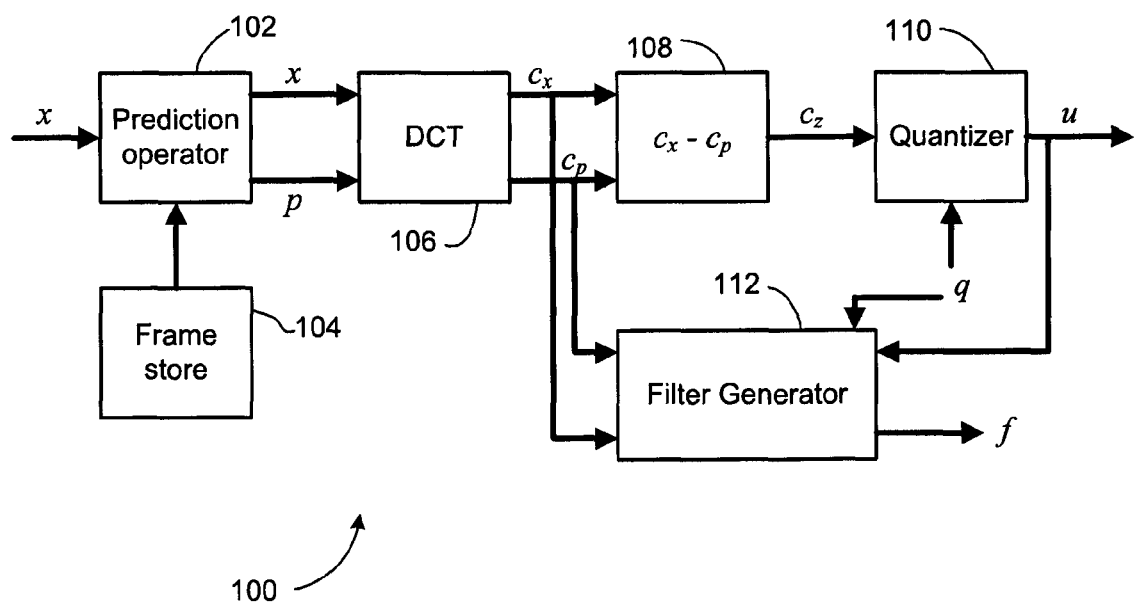
FIG. 3 shows a block diagram of an example encoder with transform domain filtering.

Reference is now made to FIG. 3, which shows a simplified block diagram of an encoder 100 with adaptive transform domain filtering. The encoder 100 includes a prediction operator 102 for selecting or generating the predictive block of samples/pixels p. The prediction operator 102 receives the original block of samples/pixels x, and may have access to a frame store 104 in which previously encoded and reconstructed frames are stored. The prediction operator 102 may apply temporal or spatial prediction. In other words, the prediction operator 102 may perform intra spatial prediction, or may apply inter motion estimation, depending on the frame type and coding mode, etc.

The original block of samples x and the predictive block of samples p are input to a spectral transform operator 106, such as a DCT. The spectral transform operator 106 produces the transformed original block of samples $c_x$ and the transformed predictive block of samples $c_p$. The encoder 100 includes a residue calculator 108, which finds the transform domain residual $c_z$ as the difference between the transformed original block of samples $c_x$ and the transformed predictive block of samples $c_p$. A quantizer 110 quantizes the transform domain residual $c_z$ to generate the quantized transform domain coefficients u.

The encoder 100 further includes a filter generator 112. The filter generator 112 receives the transformed original block of samples $c_x$, the transformed predictive block of samples $c_p$, the quantized transform domain coefficients u, and the quantization matrix/vector or scaling factor q. From this data the filter generator 112 produces the filter coefficients f, for example using Equation (3) or (6). It will be appreciated that in an embodiment in which multiple filters are developed for application to different categories of transform units (e.g. based on permutations of size, texture, coding mode, etc.), the filter generator 112 categorizes the filter (filter coefficients f) based upon these characteristics of the original block of samples $c_x$.

The filter coefficients f are included in the bitstream output from the encoder. In many embodiments, the filter coefficients may be entropy encoded and the encoded coefficients are inserted in the bitstream. In yet further embodiments, the filter coefficients may be quantized prior to entropy encoding. It will be understood that in that latter situation the decoder will need to decode the quantized coefficients and then dequantize them to realize reconstructed filter coefficients. It will also be appreciated that the quantization may introduce distortion and that a rate-distortion optimization process may be used in the quantization process to select the quantization step size for the filter coefficients.

The entropy encoding of the filter coefficients may rely upon any suitable encoding scheme. Examples include variable length coding (VLC), arithmetic coding, or variable-length-to-variable-length (V2V) coding.

The entropy encoding of the filter coefficients may be included in the beginning of the stream for a slice, e.g., in the slice header, or at the end of a slice, depending on applications. When it is transmitted in the slice header, the coefficients are usually calculated based on some previously-coded slices. In this case, the filtering process may be applied during the mode selection. One drawback of doing this might be the data mismatch between previously-coded slices and the current slice. When the coefficients are transmitted at the end of a slice, they can be calculated based on the current slice. Yet, the filtering process cannot be included in the mode selection process, unless multi-pass coding is allowed.

Figure 4:
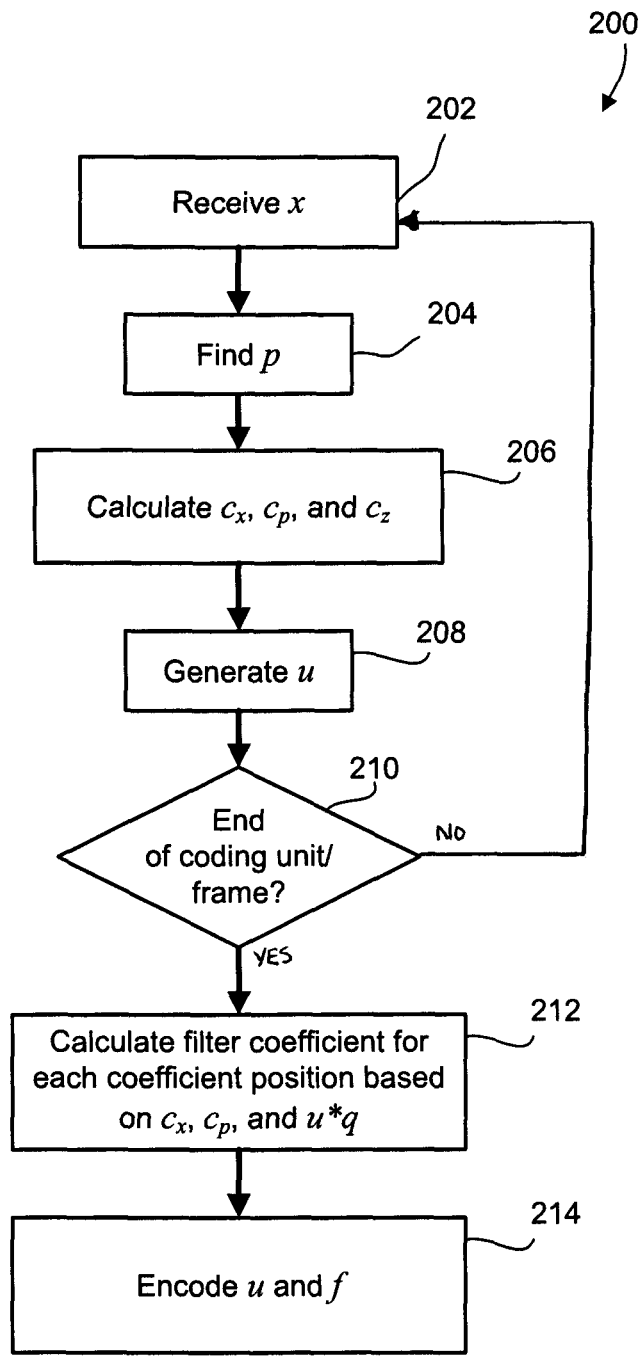
FIG. 4 shows a flowchart illustrating an example method of encoding.

One example implementation is now described with reference to FIG. 4, which shows, in flowchart form, one example embodiment of the process 200 for data compression with adaptive transform domain filtering. The process 200 begins in operation 202 with receipt of the original block of samples/pixels x. A prediction operation is then used to find the predictive block of samples p in operation 204.

In operation 206, the encoder calculates the transform domain original $c_x$, the transform domain prediction $c_p$, and the transform domain residual coefficients $c_z$. As noted above the residual may be found in the pixel domain and then transformed, or may be calculated as the difference between $c_x$ and $c_p$.

The quantized transform domain coefficients u are generated in operation 208.

In operation 210, the encoder assesses whether it has reached the end of the coding unit and/or frame and/or picture and/or group-of-pictures (depending upon whether the filters are developed on a coding unit, frame, picture, or GOP basis). If not, then it returns to operation 202 to encode the next block of original samples. If so, then in operation 212 the encoder calculates the filter coefficients for the coding unit/frame/ picture/etc. Operation 212 may include calculating multiple filters if the encoder is configured to create filters specific to predefined filter types. The coefficient positions are indicated using the indices i and j. Each filter coefficient $f_{ij}$ may be calculated as a ratio of sums taken over the number of blocks n, where n is the number of blocks associated with that filter type in the coding unit/frame/picture/etc., as the case may be. In one embodiment, the numerator is the sum of values from the same $ij^{th}$ coefficient position in the transform domain original block $c_x$. The denominator may be the sum of values from the same $ij^{th}$ coefficient position of the transform domain reconstruction, which is the transform domain predictive block $c_p$ plus the reconstructed transform domain residual given by $Q^{-1}(u)$. The filter coefficients may, thus, be calculated in accordance with the expression:

$$f_{ij} = \frac{\sum_{k=1}^{N} c_{x_k,ij}}{\sum_{k=1}^{N} (c_{p_k,ij} + Q^{-1}(u_{k,ij}))} \qquad (7)$$

In an alternative embodiment, the following expression may be used. The following expression is still an approximate solution to Equation (4), and is based on the assumption that the Lagrangian multiplier is zero, which may be acceptable if r(f) is small:

$$f_{ij} = \frac{\sum_{k=1}^{N} c_{x_k,ij} \cdot (c_{p_k,ij} + Q^{-1}(u_{k,ij}))}{\sum_{k=1}^{N} (c_{p_k,ij} + Q^{-1}(u_{k,ij}))^2} \qquad (8)$$

The encoder may be configured to use a default filter coefficient in the case that the denominator sums to zero, so as to avoid a divide-by-zero problem. The default filter coefficient may, in some embodiments, be zero. It will also be appreciated that filter coefficients are not necessarily calculated for all coefficient positions ij; in some cases, the calculated filter coefficients will only include coefficients for a predetermined number of the coefficient positions, and the remaining positions use a default filter coefficient, for example, set to 1. As an example, in the case of a 4×4 block, the filter coefficients may only be calculated for the first n coefficient positions in the scan order, where n may be preselected to be any suitable integer less than 16. Remaining positions may be assumed to be a preselected filter value or null filter value. It will be understood that the preselected or null filter values are not transmitted in the bitstream.

Although operation 212 is illustrated as occurring after the end of the coding unit/frame/picture/etc. has been reached for ease of illustration, it will be appreciated that the encoder may accumulate values throughout the encoding process of operations 202 to 210 for building the sums in the numerator and denominator, meaning that operation 212 is embedded in the looped process of operations 202 through 210. Moreover, the encoder may categorize the values and accumulate separate numerator/denominator values for the various filter types dependent upon whether it is processing a block of samples having those characteristics.

In operation 212, the encoder may evaluate whether a sufficient number of values for a particular filter type have been accumulated to justify designing a filter for that filter type. For example, the encoder may find that a frame/picture contains mostly 4×4 DCT inter-coded and 8×8 DCT inter-coded blocks, thereby justifying the development of filters for these filter types, but has only one or a few 16×16 or 32×32 DCT inter-coded blocks. Using preset threshold values, the encoder may determine for which filter types it will create a filter. The encoder may also use a rate-distortion analysis to determine whether to create a filter for a particular filter type.

In operation 214, the encoder, using an entropy encoding scheme, entropy encodes the generated quantized transform domain coefficients u and the filter coefficients f to create an output bitstream of encoded data. In the case of multiple filters, it also signals to the decoder which filters are encoded in the bitstream. It will be understood that other data is also entropy encoded in the bitstream in certain embodiments, such as motion vectors, coding mode indices, quantization scaling matrices, etc. As noted above, the coding of the filter coefficients may use any suitable entropy encoding scheme, including VLC, V2V, or arithmetic coding. Also as noted above, the filter coefficients may, in some embodiments, be quantized prior to encoding. In some instances, rather than encoding the filter coefficients themselves, a prediction and residual are encoded. For example, the prediction may be based on the immediately preceding filter coefficients with the residual being the difference between those coefficients and the currently calculated filter coefficients. In some cases, the prediction operation may involve indexing a predetermined or previously calculated set of filter coefficients that are best match to the currently calculated filter coefficients, with the residual being the difference between the indexed coefficients and the current coefficients. More generally, the prediction is some function f(x), where x are the coefficients of the previous unit and y are the coefficients of the current unit. In such a case, the residual encoded is y-f(x). Example encoding algorithms for transmitting filter data are set out below.

The example encoding and decoding processes described below are applied to transform domain filter data in the examples. It will be appreciated that these encoding and decoding processes may alternatively be applied to pixel-domain filter data in some embodiments.

Figure 5:
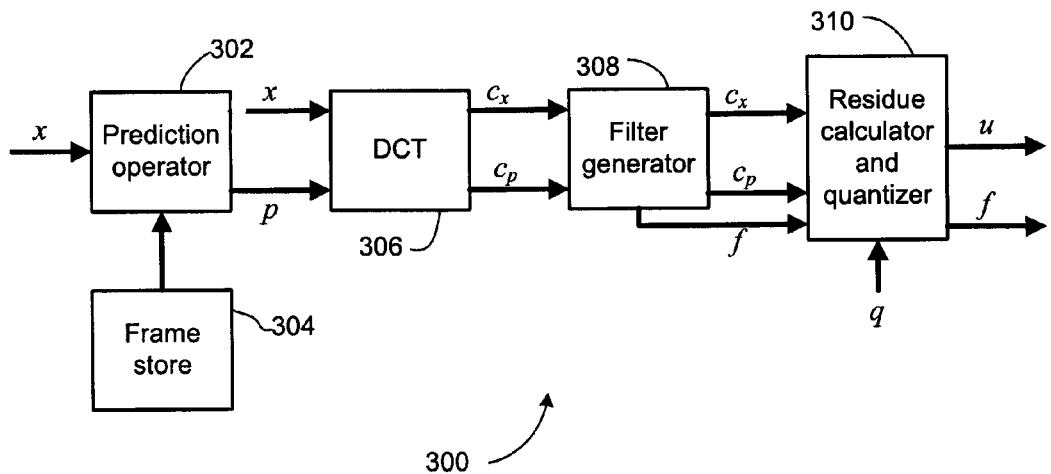
FIG. 5 shows a block diagram of another example encoder with transform domain filtering.

Reference will now be made to FIG. 5, which shows another example embodiment of an encoder 300 configured for transform domain filtering. As with the encoder 100 of FIG. 3, the encoder 300 includes a prediction operator 302, a frame store 304 and a spectral transform operator 306. The spectral transform operator 306 outputs the blocks of transform coefficients $c_x$ and the blocks of prediction transform coefficients $c_p$.

The encoder 300 includes a filter generator 308 that receives the blocks of transform coefficients $c_x$ and the blocks of prediction transform coefficients $c_p$. The filter generator 308 produces the filter coefficients in accordance with Equation (5). That is, the filter generator 308 finds filter coefficients that tend to minimize the difference between the blocks of transform coefficients $c_x$ and the blocks of prediction transform coefficients $c_p$.

The encoder 300 further includes a residual calculator 310. In this example embodiment, the residuals are calculated based upon the filtered prediction. That is, the residual calculator 310 finds the quantized transform domain coefficients a on the basis of:

$$u = Q(c_x - (f * c_p)) \qquad (9)$$

Figure 6:
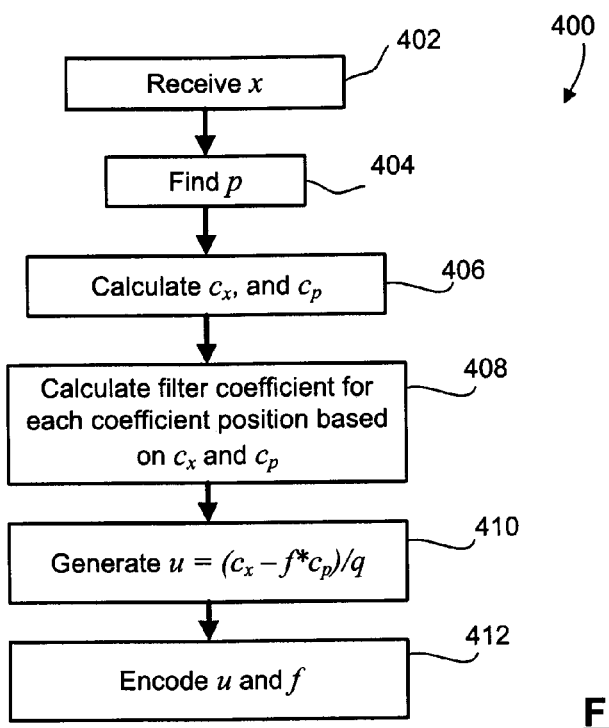
FIG. 6 shows a flowchart illustrating another example method of encoding.

One example implementation is now described with reference to FIG. 6, which shows, in flowchart form, a further example embodiment of the process 400 for data compression with adaptive transform domain filtering. The process 400 begins in operation 402 with receipt of the original blocks of samples x. A prediction operation is then used to find the predictive block of samples p in operation 404.

In operation 406, the encoder calculates the blocks of transform domain coefficients $c_x$ and the blocks of prediction transform coefficients $c_p$. Operation 408 is the calculation of the filter coefficients. It will be appreciated that operations 402 to 406 may be repeated for all blocks of a coding unit or frame, as the case may be. It will also be appreciated that the calculation in operation 408 may be embedded with the loop of operations 402 to 406, such that the encoder sums values in the numerator and denominator as the values are calculated in operation 406.

Each $ij^{th}$ filter coefficient $f_{ij}$ may be calculated as a ratio of sums taken over the number of blocks n, where n is the number of blocks in the coding unit or frame, as the case may be. In one embodiment, the numerator is the sum of values from the same $ij^{th}$ coefficient position in the blocks of transform coefficients $c_x$. The denominator may be the sum of values from the same $ij^{th}$ coefficient position of the blocks of prediction transform coefficients $c_p$. Note that this calculation does not include the reconstructed residuals as part of determining the filter coefficients. The filter coefficients may, thus, be calculated in accordance with the expression:

$$f_{ij} = \frac{\sum_{k=1}^{N} c_{x_k,ij}}{\sum_{k=1}^{N} (c_{p_k,ij})} \quad (10)$$

An alternative expression for finding the coefficients is set out below:

$$f_{ij} = \frac{\sum_{k=1}^{N} c_{x_k,ij} \cdot (c_{p_k,ij})}{\sum_{k=1}^{N} (c_{p_k,ij})^2} \quad (11)$$

The encoder may be configured to use a default filter coefficient in the case that the denominator sums to zero, so as to avoid a divide-by-zero problem. The default filter coefficient may, in some embodiments, be zero.

After the filter coefficients f have been determined for the coding unit/frame, then in operation 410 the transform domain residue is determined. In particular the encoder calculates the quantized transform domain coefficients, u, using Equation (8), for example.

In operation 412, the quantized transform domain coefficients u, the filter coefficients f, and other data is then entropy encoded to produce a bitstream of encoded data.

From the foregoing detailed discussion of examples, it will be understood that the determination and application of a filter f may be on a frame basis, on a coding unit basis, or on the basis of any other collection of blocks, such as a picture, group of pictures, or slice.

To enable the decoder to start decoding as quickly as possible, the encoder may delay outputting the encoded bitstream by one frame (or coding unit, etc., as the case may be) so that the filter coefficients f may be specified at the beginning of the encoded data for the frame/coding unit.

Transmission of Filters

In one example implementation, the filters may be transmitted or communicated from the encoder to the decoder in the slice header or in another header. The header may include a set of flags that signal which filter types are encoded in the bitstream. The ordering of the flags may be predefined or may be specified by the encoder to the decoder in side information for the video. After the flags, the filter coefficients for the various filters are encoded in the bitstream. The filter coefficients may specify transform-domain filters or pixel-domain filters. Some of the examples below specifically reference transform-domain filtering, but may be applied to the transmission of filter data for pixel-domain filtering in other embodiments.

In one example embodiment, let TDF[qP][DataType][i] denote the filter coefficient for a given qP, given DataType, and a frequency group index i. The frequency group index i refers to the group of coefficient positions, for example as illustrated in FIGS. 11 and 12 for 4×4 blocks. TDF[qP][DataType][i] may be represented with 7-bit arithmetic precision. In a pixel-domain example, the group index i may refer to another grouping, such as by pixel position within a block.

An example process for transmitting TDF[qP][DataType][i] is as follows:

TDF[qP][DataType][i] is clipped to be within a range of [64, 191] ([0.5, 1.5] in the floating-point representation). TDF[qP][DataType][i] predicted with a fixed prediction value of 128. The prediction error is then defined as TDFd[qP][DataType][i]=TDF[qP][DataType][i]−128, which is within a range of [−64, 63]. Experiments show that TDF[qP][DataType][i] is normally close to 1 and correspondingly 0 for TDFd[qP][DataType][i]. TDFd[qP][DataType][i] may be directly entropy-coded and transmitted as part of the slice header in the bitstream. Examples of entropy coding schemes for encoding TDFd include a fixed-length code, a Golomb-Rice code based on the probability distribution of the indices, and a Huffman code designed based on the probability distribution of the indices.

One example syntax for the bitstream is illustrated in the following pseudo-code for a function TDF_param( ) implemented at the decoder to obtain the filter coefficients:

| TDF_param( ) { | Descriptor |
|---|---|
|   TDF_slice_flag | u(1) |
|   If(TDF_slice_flag) | |
|   { | |
|     for(i=0; i <=NUM_TDF_DATA_TYPES; i++) | u(1) |
|     { | |
|       TDF_data_type_flag | u(1) |
|       read_TDF_data(i) | |
|     } | |
|   } | |
| } | |
| read_TDF_data (TDF_data_type_id){ | |
|   for(i=0; i<=6; i++){ | |
|     TDFd[slice_qp][ TDF_data_type_id][i] | se(v) |
|   } | |
| } | |

In the above syntax, se(v) is the signed integer Exp-Golumb code. The value NUM_TDF_DATA_TYPES specifies the total number of prediction filter types, i.e. the total number of filter-type flags (TDF_data_type_flag) to be read from the bitstream.

In another example embodiment, the filter coefficients may be encoded and decoded using the following scheme.

The filter coefficients are first predicted as TDFp[qP][DataType][i]. The prediction error is given by TDFd[qP][DataType][i]=TDF[qP][DataType][i]−TDFp[qP][DataType][i]. The prediction error may be converted to an index value through quantization: TDF_delta_idx[qP][DataType][i]=Q(TDFd[qP][DataType][i]). The syntax element TDF_delta_idx[qP][DataType][i] specifies the corresponding quantization index, which is entropy-coded and transmitted in the bitstream. Q(•) denotes the forward quantization function.

At the decoder, TDF is reconstructed from the corresponding received TDF_delta_idx as follows: TDF'[qP][DataType][i]=invQ(TDF_delta_idx[qP][DataType][i])+TDFp[qP][DataType][i], where TDF' denotes the reconstruction of TDF parameter, and invQ(.) denotes the inverse quantization function.

The prediction TDFp may be found in a number of possible ways. One is to use a fixed default prediction value. For example, a default prediction value may be selected to be TDFp[qP][DataType][i]=128. Note that different default prediction values may be used based on quantization parameter, data type, index, temporal layer of slice, etc. Another possibility is to base the prediction on previously-coded TDF values. For example, the prediction of the filter coefficient for one frequency position based on the reconstructed filter coefficients of its neighboring frequency positions.

The quantization of TDFd may also be implemented in a number of ways. For example, in one case uniform quantization may be used. In uniform quantization, given a quantization step size q, the forward and inverse quantization of the prediction error TDFd are given by:

Forward quantization: TDF_delta_idx=Q(TDFd)=sign (TDFd)·round (abs(TDFd)/q+f), where 1>f>0 is a rounding offset Inverse quantization: TDFd'=invQ(TDF_delta_idx) =TDF_delta_idx·q Non-uniform quantizers may also be designed for quantizing the prediction error TDFd based on its statistics.

Another example syntax for the bitstream is illustrated in the following pseudo-code for the function TDF_param( ) implemented at the decoder to obtain the filter coefficients based on encoding of the quantized prediction error:

| TDF_param( ) { | Descriptor |
|---|---|
| TDF_slice_flag | u(1) |
| If(TDF_slice_flag) | |
| { | |
| for(i=0; i <=NUM_TDF_DATA_TYPES; i++) | u(1) |
| { | |
| TDF_data_type_flag | u(1) |
| read_TDF_data(i) | |
| } | |
| } | |
| } | |
| read_TDF_data (TDF_data_type_id){ | |
| for(i=0; i<=6; i++){ | |
| TDF_delta_idx[slice_qp][ TDF_data_type_id][i] | vlc(v) |
| } | |
| } | |

Figure 7:
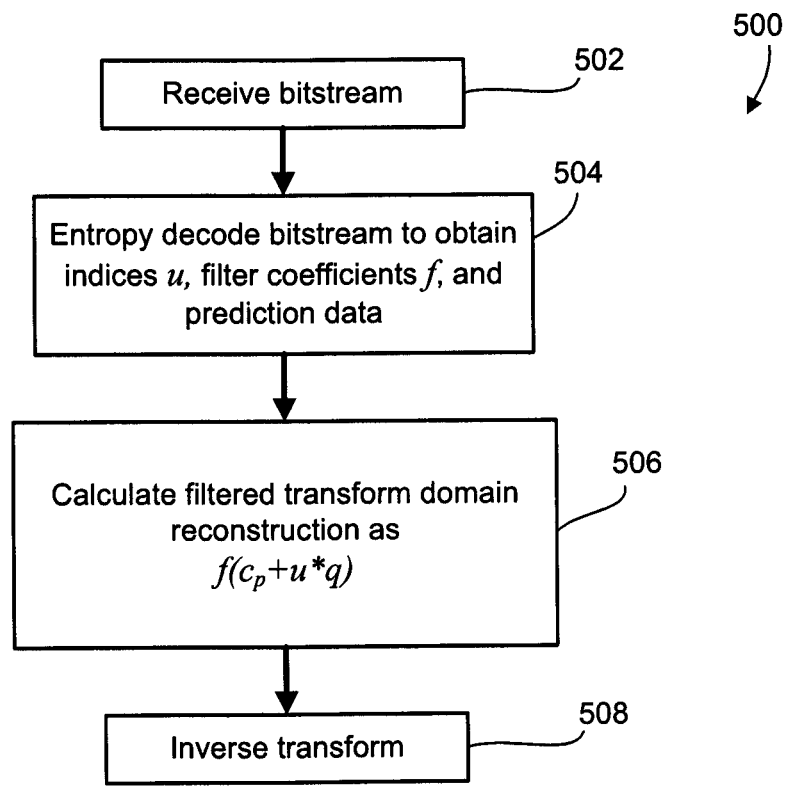
FIG. 7 shows a flowchart illustrating a first example method of decoding with transform domain filtering.

Reference is now made to FIG. 7, which shows, in flowchart form, a process 500 for decoding an encoded bitstream of data using transform domain filtering. The process 500 includes receiving the bitstream in operation 502 and entropy decoding the bitstream in operation 504 to recover the quantized transform domain coefficients u, the filter coefficients f, and other data, such as data that enables the decoder to determine the prediction (for example, motion vector(s) and reference frame indices). The bitstream may be based upon one of the syntaxes discussed above. The entropy decoding of the bitstream may include reading the flags indicating which filter types are present and then, based on the flag values, entropy decoding the filter coefficients for each filter type that is present.

In operation 506, the decoder calculates the filtered transform domain reconstruction, $c_{\hat{x}}$, by calculating the transform domain reconstruction as the transform domain prediction block plus the dequantized transform domain residual, and then applying the filter f. The calculation can be expressed as:

$$c_{\hat{x}} = f^*(c_p + Q^{-1}(u)) \quad (12)$$

It will be appreciated that operation 506 may include the decoder identifying or generating the predictive block of samples based on the decoded prediction data. For example, the decoder may identify the reference block from a reference frame based on motion vector information. Operation 506 may further include spectrally transforming the predictive block of samples to obtain the transform domain prediction block $c_p$. Equation (12) may then be used to realize the transform domain reconstructed block.

The decoder then, in operation 508, inverse transforms the transform domain reconstruction to produce the reconstructed pixel domain block $\hat{x}$.

Figure 8:
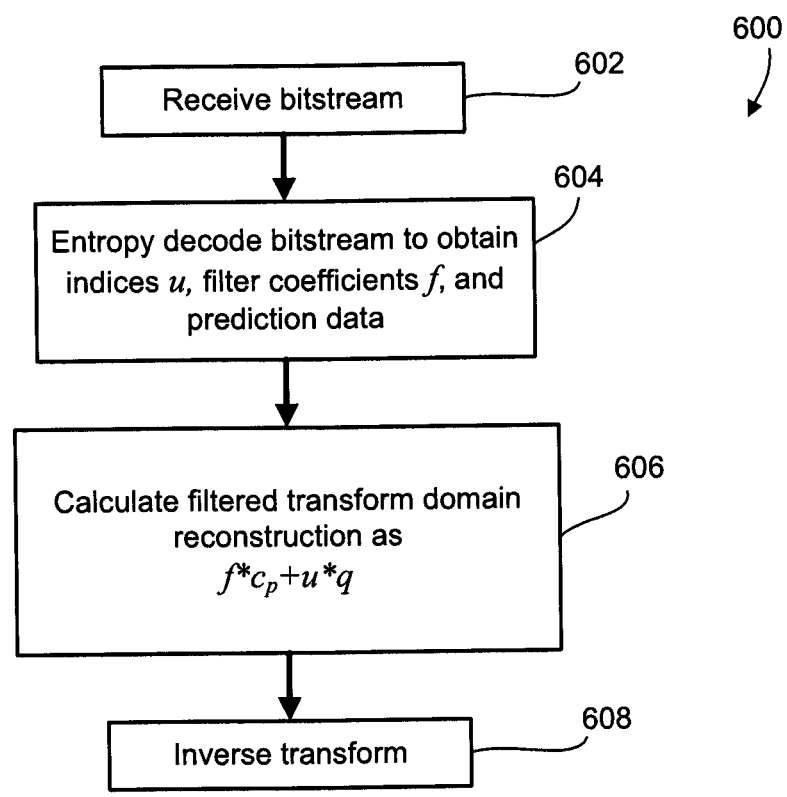
FIG. 8 shows a flowchart illustrating a second example method of decoding with transform domain filtering.

Another example decoding process 600 will now be described with reference to FIG. 8, which shows the process 600 in flowchart form. The process 600 in FIG. 8 is applicable to embodiments in which the residual was calculated from the filtered prediction at the encoder, as was described above in connection with FIGS. 5 and 6. The process 600 may also be applicable to cases in which the residual was calculated from the unfiltered prediction, like in FIGS. 3 and 4, but where the encoder transmits a quantization matrix q that specifies coefficient-position based quantization step sizes. In this case, the scaling represented by the filter matrix f may be incorporated in the quantization matrix q, meaning that it need not be applied to the reconstructed transform domain residuals at the decoder.

In operations 602 and 604 the decoder receives the bitstream and entropy decodes it to recover the quantized transform domain coefficients u, the quantization step size (or quantization vector or matrix q, in some embodiments), the filter coefficients f, and prediction data (such as motion vector (s), etc.). In operation 606, the decoder calculates the filtered transform domain reconstruction, $c_{\hat{x}}$, by calculating the sum of the filtered transform domain prediction block and the dequantized transform domain residual. The calculation may be expressed as:

$$c_{\hat{x}} = f^* c_p + Q^{-1}(u) \quad (13)$$

As detailed above in connection with operation 506, operation 606 may include the decoder generating or identifying the predictive block of samples and spectrally transforming the predictive block of samples to obtain the transform domain prediction block $c_p$.

In one embodiment, the filter or TDF in Equations (12) or (13) may include a single scalar applicable to a group of transform coefficients, i.e for linearly scaling each of the coefficients in the group. The group of coefficients may be formed based on various coding parameters such as transform sizes, transform types, frequency positions, prediction modes, and data textures.

The decoder then inverse transform the filtered transform domain reconstruction to obtain the reconstructed block of pixels $\hat{x}$.

Although the processed described above and illustrated in FIGS. 8 and 9 relate to the transmission and use of transform-domain filter data, it will be appreciated that similar processes may be used to transmit and use pixel-domain filter data. For example, the decoder may receive and decode the bitstream to obtain indices u, filter coefficients f, and prediction data. The decoder may then reconstruct pixel-domain residual blocks by dequantizing the indices and inverse transforming the dequantized transform coefficients. In the pixel-domain, the decoder may then filter the prediction blocks using a filter specified by the filter coefficients f, or it may reconstruct the pixel data by combining the residual block with the predicted block and then filter the resulting reconstructed pixel block. In either case, it will be understood that the filter coefficients f may be specified in the bitstream using indices, predictions, prediction error, quantization, or combinations thereof, as described above.

Figure 9:
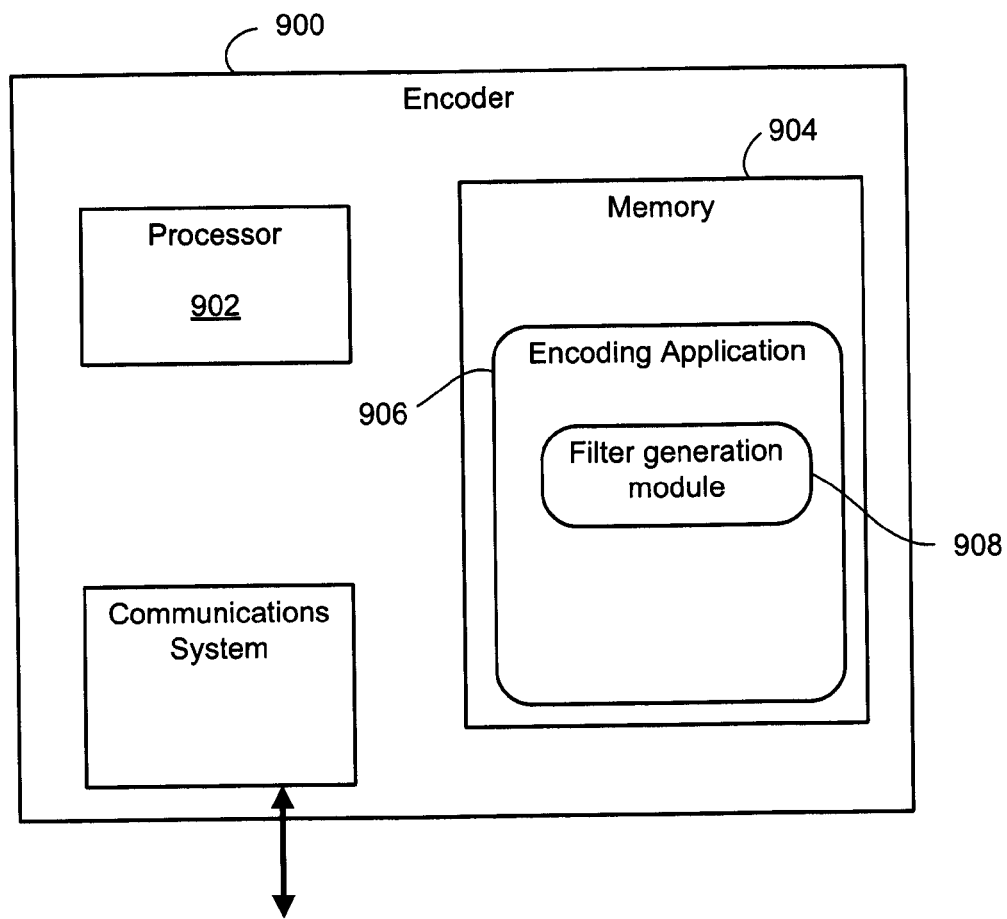
FIG. 9 shows a simplified block diagram of an example embodiment of an encoder.

Reference is now made to FIG. 9, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform steps or operations such as those described herein. For example, the encoding application 906 may encode and output bitstreams encoded in accordance with the processes described herein. The input data points may relate to audio, images, video, or other data that may be subject of a lossy data compression scheme. The encoding application 906 may include a filter generation module 908 configured to determine filter coefficients for a frame, coding unit, or other collection of blocks. The encoding application 906 may include an entropy encoder configured to entropy encode the filter coefficients f and other data as part of the bitstream. It will be understood that the encoding application 906 may be stored in on a computer readable medium, such as a compact disc, flash memory device, random access memory, hard drive, etc.

Figure 10:
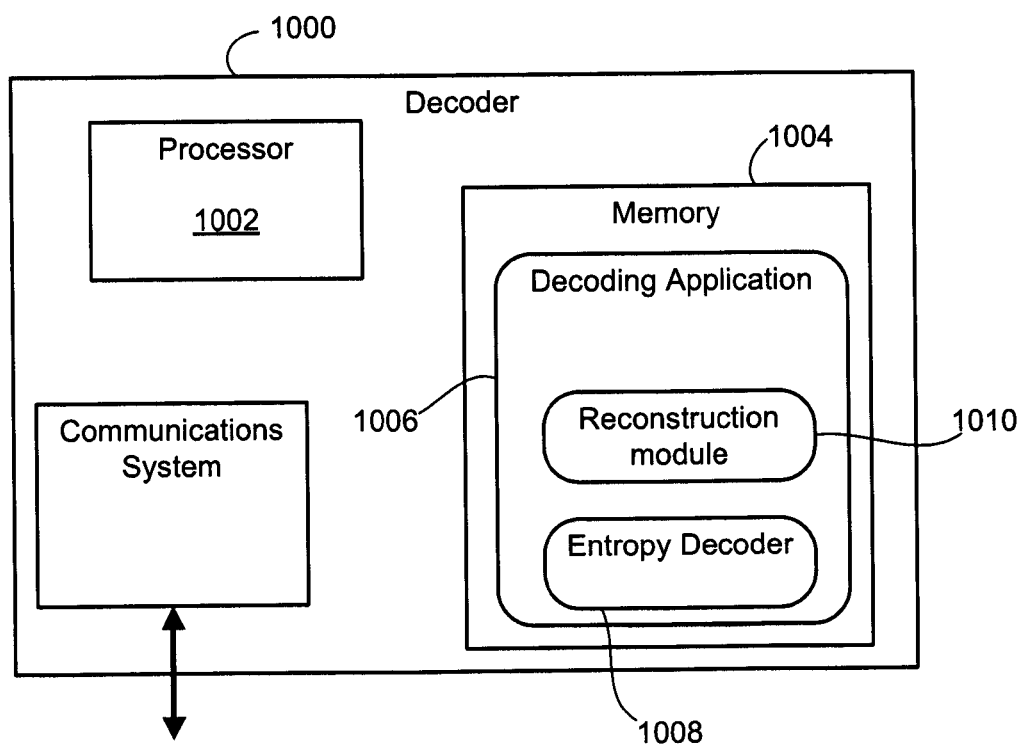
FIG. 10 shows a simplified block diagram of an example embodiment of a decoder.

Reference is now also made to FIG. 10, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform steps or operations such as those described herein. The decoding application 1006 may include an entropy decoder 1008 and a reconstruction module 1010 configured to obtain filter coefficients f and to use them to calculate a filtered transform domain reconstruction, which the decoding application 1006 is configured to inverse transform to produce the reconstructed block of pixels. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of reconstructing a block of samples from a bitstream of encoded data in a decoder, the method comprising:
reconstructing a spectrally transformed prediction block of samples associated with the block of samples;
reading filter-type flags from the bitstream, wherein the filter-type flags identify one or more filter types;
for each of the filter types identified, decoding a set of filter coefficients from the bitstream; and
calculating a filtered transform domain reconstruction by applying, to at least a portion of the transformed prediction block, one of the sets of filter coefficients based on its filter type matching characteristics associated with the block of samples.

2. The method claimed in claim 1, wherein calculating includes determining the characteristics of the block of samples and selecting the one of the sets of filter coefficients based on its filter type matching the characteristics.

3. The method claimed in claim 1, wherein the filter types are based on at least one of transform size, coding mode, prediction mode, and texture type.

4. The method claimed in claim 1, wherein the characteristics include motion vector characteristics, and wherein the filter types include two or more filter types applicable to respective groups of inter-coded blocks, and wherein each respective group of inter-coded blocks is associated with a respective group of motion vector characteristics.

5. The method claimed in claim 1, wherein the characteristics include directional prediction modes, and wherein the filter types include two or more filter types applicable to respective groups of intra-coded blocks, and wherein each respective group of intra-coded blocks is associated with a group of directional prediction modes.

6. The method claimed in claim 1, wherein the set of filter coefficients defines a filter, wherein the set of filter coefficients includes a coefficient for each coefficient group in the filter, and wherein at least one coefficient group includes two or more coefficient positions.

7. The method claimed in claim 1, wherein calculating the filtered transform domain reconstruction comprises calculating a filtered prediction by scaling at least a portion of the transformed prediction block by the filter coefficients and dequantizing a block of quantized transform domain coefficients, and wherein the filtered transform domain reconstruction comprises the sum of the filtered prediction and the dequantized block of transform domain coefficients.

8. The method claimed in claim 1, wherein calculating the filtered transform domain reconstruction comprises:
dequantizing a block of quantized transform domain coefficients;

calculating a transform domain reconstruction block as the transformed prediction block plus the dequantized block of transform domain coefficients; and scaling the transform domain reconstruction block using the filter coefficients.

9. A non-transitory computer-readable medium storing computer-executable instructions which, when executed by a processor, configure the processor to perform the method claimed in claim 1.

10. A method of reconstructing a block of samples from a bitstream of encoded data in a decoder, the method comprising:

reconstructing a prediction block of samples associated with the block of samples;

reading filter-type flags from the bitstream, wherein the filter-type flags identify one or more filter types;

for each of the filter types identified, decoding a set of filter coefficients from the bitstream; and calculating a filtered pixel-domain reconstruction by applying, to at least a portion of the prediction block, one of the sets of filter coefficients based on its filter type matching characteristic associated with the block of samples.

11. A non-transitory computer-readable medium storing computer-executable instructions which, when executed by a processor, configure the processor to perform the method claimed in claim 10.

12. A decoder, comprising:

a processor;

a memory; and a decoding application stored in memory and containing instructions for configuring the processor to reconstruct a spectrally transformed prediction block of samples associated with the block of samples;

read filter-type flags from the bitstream, wherein the filter-type flags identify one or more filter types;

for each of the filter types identified, decode a set of filter coefficients from the bitstream; and calculate a filtered transform domain reconstruction by applying, to at least a portion of the transformed prediction block, one of the sets of filter coefficients based on its filter type matching characteristics associated with the block of samples.

13. The decoder claimed in claim 12, wherein the processor is configured to calculate the filtered transform domain reconstruction by determining the characteristics of the block of samples and selecting the one of the sets of filter coefficients based on its filter type matching the characteristics.

14. The decoder claimed in claim 12, wherein the filter types are based on at least one of transform size, coding mode, prediction mode, and texture type.

15. The decoder claimed in claim 12, wherein the characteristics include motion vector characteristics, and wherein the filter types include two or more filter types applicable to respective groups of inter-coded blocks, and wherein each respective group of inter-coded blocks is associated with a respective group of motion vector characteristics.

16. The decoder claimed in claim 12, wherein the characteristics include directional prediction modes, and wherein the filter types include two or more filter types applicable to respective groups of intra-coded blocks, and wherein each respective group of intra-coded blocks is associated with a group of directional prediction modes.

17. The decoder claimed in claim 12, wherein the set of filter coefficients defines a filter, wherein the set of filter coefficients includes a coefficient for each coefficient group in the filter, and wherein at least one coefficient group includes two or more coefficient positions.

18. The decoder claimed in claim 12, wherein the processor is configured to calculate the filtered transform domain reconstruction by calculating a filtered prediction by scaling at least a portion of the transformed prediction block by the filter coefficients and dequantizing a block of quantized transform domain coefficients, and wherein the filtered transform domain reconstruction comprises the sum of the filtered prediction and the dequantized block of transform domain coefficients.

19. The decoder claimed in claim 12, wherein the processor is configured to calculate the filtered transform domain reconstruction by:

dequantizing a block of quantized transform domain coefficients;

calculating a transform domain reconstruction block as the transformed prediction block plus the dequantized block of transform domain coefficients; and scaling the transform domain reconstruction block using the filter coefficients.

* * * * *